L. M. MAXHAM.
SELF ACTING FENDER.
APPLICATION FILED NOV. 21, 1907.
906,047.
Patented Dec. 8, 1908.
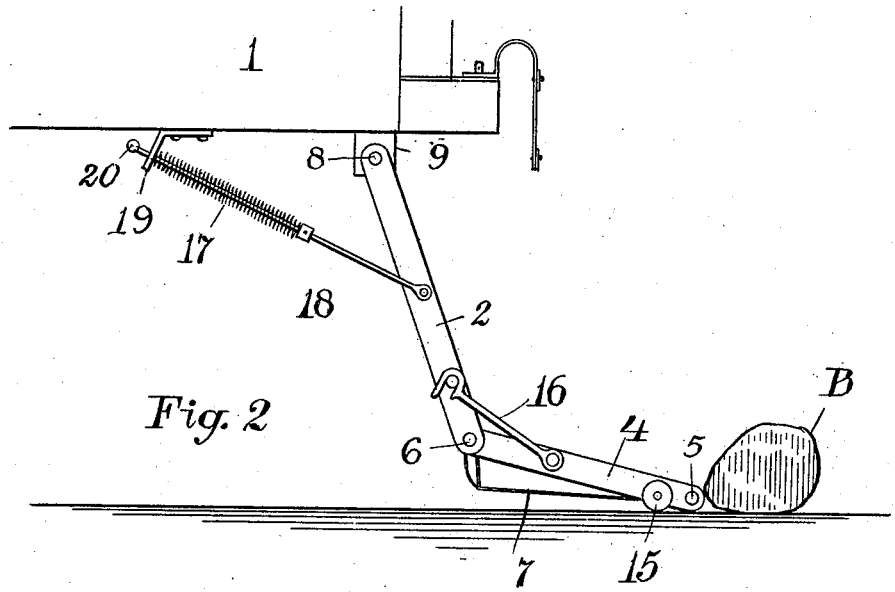
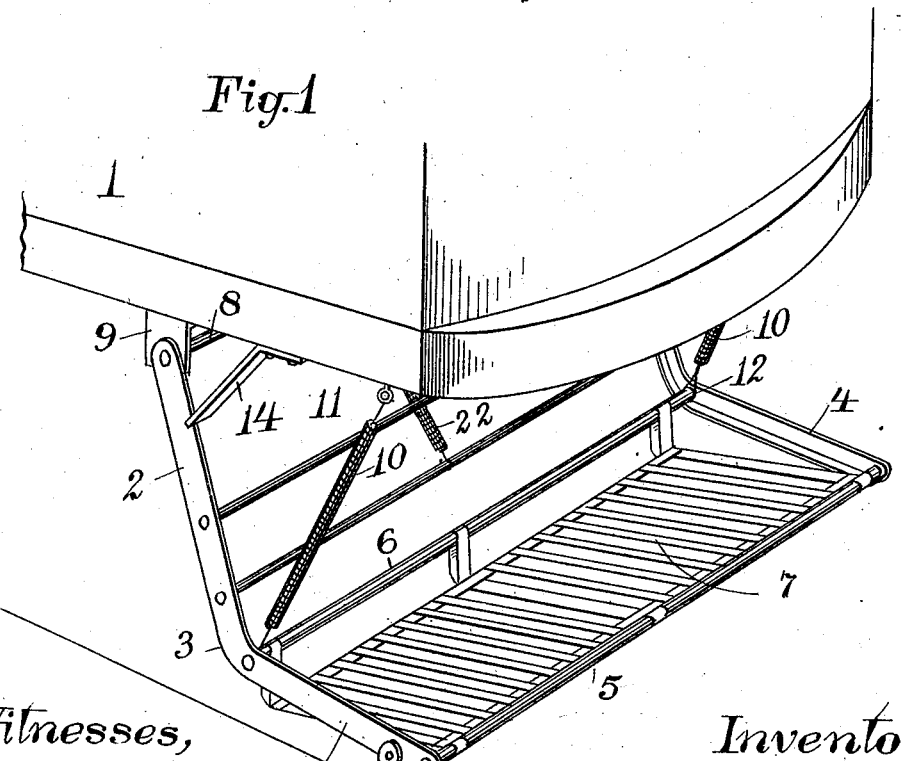
Witnesses,
Inventor,
Lowell M. Maxham;

UNITED STATES PATENT OFFICE.

LOWELL M. MAXHAM, OF BOSTON, MASSACHUSETTS.

SELF-ACTING FENDER.

No. 906,047.  Specification of Letters Patent.  Patented Dec. 8, 1908.

Application filed November 21, 1907. Serial No. 403,184.

*To all whom it may concern:*

Be it known that I, LOWELL M. MAXHAM, a citizen of the United States, and a resident of Boston, in the county of Suffolk and Commonwealth of Massachusetts, have invented certain new and useful Improvements in Self-Acting Fenders, of which the following is a full, clear, and exact specification.

The object of this invention is the construction of an improved fender for automobiles, street-cars and other conveyances, which shall be automatically brought to the ground by contact with the body of a person lying thereon, and so caused to scoop up such body and protect it from harm.

To this end my invention consists essentially in the effecting of means whereby, when the fender-nose is forcibly met by any object lying on the ground, the impact will itself force the fender-nose to the ground, independent of gravity or any other means.

Referring to the drawings forming part of this specification, Figure 1 is a perspective view of a fender made in accordance with my invention, showing the fender in its normal position. Fig. 2 is a side elevation of the fender in a slightly modified form, and showing it forced to the ground by engagement with an object.

I have shown my fender as applied to a street-car, but I also design it for use in connection with automobiles and other conveyances. Such car 1 has pivoted close beneath its front platform a pair of side arms 2 each bent at an obtuse angle at an intermediate point 3; the more nearly horizontal sections 4 being rigidly united by cross rods 5 and 6 carrying the cradle slats 7.

The pivoted ends of the side arms 2 are preferably fixed upon a cross rod 8 which is loosely supported by the angle irons 9 bolted to the under surfaces of the side sills of the car 1. Coiled springs 10 held at their upper ends by a suitable means, as the screw-eyes 11, and attached at their lower ends to the fender, as by means of eyes 12 encircling the cross rod 6, serve to resiliently support the fender normally out of contact with the ground. Stops 14 bolted to the car sills and suitably terminating in front of the side arms 2, keep the fender from rising higher than its normal position.

It will be noticed that the pivotal points of the side arms are much higher than the fender nose or cross bar 5, and also substantially to the rear thereof, such pivotal points and nose being preferably located in a plane inclined at an angle of approximately forty-five degrees with the ground. Thus positioned, such fender-nose will have a sufficiently rearward as well as downward movement when striking an object to insure that such nose will be forced to the ground, and so caused to run in beneath the object. If the fender-nose and its pivotal points are in a plane inclined more acutely with respect to the ground, there is great danger of the object's being caught beneath the said nose and keeping the latter from depression, with the result of crushing the object instead of scooping it up. Hence, under the impact of engagement with a stationary body, as B in Fig. 2, the side arms will swing downward and rearward upon the rod 8 as a center, until contact with the ground or track prevents further yielding. Then carried along with the car, the fender nose advances beneath such body and rolls it back into the cradle 7.

For automobiles, where the fender nose would have to slide along the rough ground and might catch and make trouble, I prefer to provide small anti-friction wheels 15 to keep the fender itself from contact with the ground; but for street car use where the tracks are paved with stones, and where the friction between the same and iron is not great, such wheels are hardly necessary.

While I prefer to have each side arm in one integral piece, or two lengths of bar or angle iron rigid with each other, there are some makes of cars where the fender must be pivoted so far forward as to require that the cradle can be turned upward for housing, or when the opposite end of the car is made the forward end. For such purpose I pivot the two sections 2 and 4 together at the elbow 3, and provide a removable brace 16 for keeping the parts normally rigid.

Instead of using tension springs 10, push springs 17 are provided for this latter construction; such springs being mounted on the rods 18 which are each pivoted at its front end to the side bar 2, and at its rear end slidable in an angle iron 19. A head 20 on such rear end forms the stop for keeping the fender from rising above its normal position.

Inasmuch as the fender has a rearward as well as a downward movement, the object cannot fail to force the fender to the ground, except possibly when the loose clothing of a person comes between it and the ground. In such case, the person would either be pushed along, or rolled over and up upon the fender. In neither instance would he be able to reach the car wheels, or be in other danger of injury.

A further improvement is effected by means of the tension spring or springs 22 pulling the fender in opposition to the springs 10. When these springs 22 are used, the fender is not normally in contact with the stops 14 but is adjusted to be resiliently supported slightly out of contact therewith. Thus held, the fender is much more easily actuated by engagement with an object on the ground, while at the same time the stops are at hand to keep the fender from the possibility of rising higher than the distance found best suited to the work.

What I claim as my invention and for which I desire Letters Patent is as follows, to wit:—

1. The combination with a conveyance, of a fender consisting of a pair of side-arms each of which is composed of two parts making an angle one with respect to the other at substantially its midlength, a cradle held by the more nearly horizontal sections of said side-arms, pivotal means uniting the upper ends of the more nearly vertical sections of said side-arms to the said conveyance, resilient means yieldingly supporting the nose of the fender at a predetermined limited distance from the surface on which the conveyance moves, and a stop for limiting the upward position of the fender nose, the nose of said fender being located in a plane cutting the pivotal points of the fender at approximately forty-five degrees with the horizon whereby the impact of the nose of the fender with an object on said surface will force such nose down and rearward and cause such object to mount the fender.

2. The combination with a street car, of a fender consisting of side arms each having an intermediate bend, a cradle held by the more nearly horizontal sections of said side-arms, pivotal means uniting the upper ends of the more nearly vertical sections of said side-arms to the under side of said car, coiled tension springs terminally attached to said side arms near the bends thereof and also to anchoring means rigid with the car in advance of said pivotal means, and stops held by said car and engaged by said more nearly vertical sections of said side-arms for limiting the upward position of the fender, whereby the impact of the nose of the fender with an object lying on the track will force such nose down and rearward and cause such object to mount the fender.

In testimony that I claim the foregoing invention, I have hereunto set my hand this 19th day of November, 1907.

LOWELL M. MAXHAM.

Witnesses:
  A. B. UPHAM,
  GEORGE F. WALES.